(12) United States Patent
Levy et al.

(10) Patent No.: US 10,112,859 B2
(45) Date of Patent: Oct. 30, 2018

(54) MODULAR FLUID PURIFICATION SYSTEM AND COMPONENTS THEREOF

(75) Inventors: Ehud Levy, Atlanta, GA (US); John W. Tadlock, West Chicago, IL (US); Peter Wang, Lilburn, GA (US)

(73) Assignee: SELECTO, INC., Suwanee, GA (US)

( * ) Notice: Subject to any disclaimer, the term of this patent is extended or adjusted under 35 U.S.C. 154(b) by 0 days.

(21) Appl. No.: 12/631,547

(22) Filed: Dec. 4, 2009

(65) Prior Publication Data

US 2010/0140156 A1 Jun. 10, 2010

Related U.S. Application Data

(62) Division of application No. 11/169,855, filed on Jun. 29, 2005, now Pat. No. 7,673,756.

(51) Int. Cl.
| | |
|---|---|
| B01D 29/11 | (2006.01) |
| B01D 35/30 | (2006.01) |
| C02F 1/00 | (2006.01) |
| C02F 9/00 | (2006.01) |
| F16L 37/14 | (2006.01) |
| F16L 37/56 | (2006.01) |

(52) U.S. Cl.
CPC ............ *C02F 9/005* (2013.01); *B01D 29/114* (2013.01); *B01D 35/303* (2013.01); *C02F 1/004* (2013.01); *F16L 37/144* (2013.01); *F16L 37/56* (2013.01); *B01D 2201/302* (2013.01); *B01D 2201/305* (2013.01); *B01D 2201/4015* (2013.01); *B01D 2201/44* (2013.01); *C02F 2201/006* (2013.01)

(58) Field of Classification Search
None
See application file for complete search history.

(56) References Cited

U.S. PATENT DOCUMENTS

| | | | | |
|---|---|---|---|---|
| 3,324,853 | A | * | 6/1967 | Czorny et al. ................. 604/162 |
| 4,224,721 | A | * | 9/1980 | Ohlson ............................ 24/489 |
| 4,244,544 | A | * | 1/1981 | Kornat ......................... 248/68.1 |
| 5,331,725 | A | | 7/1994 | Chou |
| 5,542,716 | A | | 8/1996 | Szabo et al. |
| 5,607,192 | A | * | 3/1997 | Lee ........................ F16L 37/144 |
| | | | | 285/305 |
| 6,405,414 | B1 | * | 6/2002 | Byrnes et al. ................... 24/339 |
| 2002/0134789 | A1 | * | 9/2002 | Lin ............................... 220/758 |
| 2005/0045552 | A1 | * | 3/2005 | Tadlock ............... B01D 35/303 |
| | | | | 210/440 |

* cited by examiner

*Primary Examiner* — Benjamin M Kurtz
(74) *Attorney, Agent, or Firm* — Dickinson Wright PLLC

(57) ABSTRACT

This invention relates to a modular purification system having a disposable sump assembly and an improved flow distribution plate. The system is readily adaptable to a variety of configurations without the need for repiping or replumbing of the installation, and lends itself to the use of multiple purification techniques.

14 Claims, 16 Drawing Sheets

MODULAR FLUID PURIFICATION SYSTEM AND COMPONENTS THEREOF

CROSS-REFERENCE TO RELATED APPLICATIONS

This application is a divisional application of U.S. application Ser. No. 11/169,855 entitled MODULAR FLUID PURIFICATION SYSTEM AND COMPONENTS THEREOF, filed on Jun. 29, 2005, now U.S. Pat. No. 7,673,756, the entire contents of which is hereby incorporated by reference.

BACKGROUND OF THE INVENTION

1. Field of the Invention

The invention relates to a fluid purification system that is modular, easily modified and adapted to different installations, and can be serviced in a sanitary manner, without the need for service personnel to have contact with the filter media or filtered material thereon. The invention is particularly suitable for filtering water used in the beverage and food industries, e.g., for water purification at restaurants, hotels, and the like.

2. Description of Related Art

Conventional water purification installations for the food and beverage industry contain inflow piping, a purification head and sump, purification media disposed within the sump, and outflow piping. The purification head directs the inflowing water to a flow path typically between the sump and the purification media (often a cylindrical block of activated carbon particles bonded together with a polymeric binder resin, and having an opening along the longitudinal axis thereof). Water is forced through the purification media, and removed (e.g., by flow through the central opening thereof) through the outflow piping.

Typically, the sump and purification head are threaded together. Changing of the purification media cartridge is done by unscrewing the sump, pulling out the cartridge, inserting a new cartridge, and screwing the sump back on the purification head. This requires contact with the used cartridge, a potentially unsanitary condition, since these purification cartridges often remove microorganisms and heavy metals from the water. Moreover, improper replacement of the sump makes the system prone to leaking. Special tools are necessary to remove and replace the sump without leakage.

With conventional systems, the use of multiple purification media requires the use of multiple manifolds and purification heads and sumps, connected by piping and plumbing fittings, all of which are prone to leak, particularly as the system is stressed during maintenance and cartridge replacement. In addition, these systems are typically wall mounted, and require robust wall mounting hardware to support their weight and the stresses imposed by flow through the system, maintenance, etc. Parallel flow systems typically require a large number of pipe fittings and connections, which increase pressure drop in the system and decrease the maximum flow rate through the system. Often, these fittings are metallic, and can leach metal into the water, creating health and safety issues.

Conventional sump/purification head designs also are deficient in that they do not make full use of the purification media cartridge. Flow into the sump creates "dead zones" in the sump where flow does not reach, and concentrates flow in other areas of the sump. As a result, large areas of the purification media remain unused because unfiltered water does not contact them, while other areas become clogged or saturated with contaminants very rapidly, because all of the flow passes through them. This phenomenon significantly decreases the life of the filter media cartridge, requiring an increased level of maintenance, increased cost, and increased risk of health or safety issues to consumers.

Conventional purification systems also are designed with multiple and different internal diameters for various fittings, inlets, outlets, internal flow conduits, and other openings within the system. Typically, this inconsistency results in fluid passing from a larger diameter conduit, opening, or chamber, to a lower diameter opening; in effect, conventional purification systems require that the fluid pass through internal "orifices." These orifices reduce the fluid conductance of the system, since each additional "orifice" added in series lowers the overall conductance of the system, in accordance with the formula:

$$\frac{1}{C_{total}} + \frac{1}{C_1} + \frac{1}{C_2} + \ldots + \frac{1}{C_n}$$

where $C_{total}$ is the fluid conductance of the entire apparatus, $C_1$ is the fluid conductance of the first orifice in the system, and $C_n$ is the fluid conductance of the nth orifice in the system. Each orifice therefore reduces the flow rate through the system for a given pressure drop, according to the formula:

$$Q = C_{total}(P_{final} - P_{initial})$$

where Q is the flow rate through the system, $C_{total}$ is the fluid conductance of the entire apparatus, and $P_{final} - P_{initial}$ is the pressure drop across the apparatus. Currently available filtration systems have sufficiently low fluid conductance that water filtration flow rates of only about 10 gpm (for a pressure drop of 10 psi) are obtained.

There remains a need in the art for a purification system that is flexible (e.g., that allows both serial and parallel flows through the same system without undue piping and pipe fittings), that is modular (e.g., that allows easy change out of purification media cartridges without the need for service personnel to have contact with contaminated purification media), that has a reduced pressure drop and increased maximum flow rate, and that does not suffer from the "dead zone" phenomenon (i.e., has increased cartridge life). Further, there is a need for systems that are easily assembled, require few or no metallic fittings or solder to corrode or leak, and are unlikely to leak. Finally, there is a need in the art for purification systems that can deliver much higher flow rates at acceptable pressure drops than are currently available in existing, conventional fluid purification systems.

SUMMARY OF THE INVENTION

This invention relates, in its broad aspects, to a purification system and various components thereof, that avoid some or all of the deficiencies noted above, and which typically occur with conventional purification systems.

In one embodiment, the invention relates to a purification system comprising:
  a disposable sump assembly comprising:
    a longitudinal side wall;
    a distal bottom portion integral with the longitudinal side wall;
    a disposable purification media cartridge disposed within the sump, displaced from the longitudinal side wall to create a gap through which unfiltered fluid can flow, and having a longitudinal central opening through which filtered fluid can flow;

a purification head assembly detachably connected to the sump, comprising:

an inlet in fluid communication with the gap;

an outlet in fluid communication with the longitudinal central opening;

a flow dispersal plate disposed between the inlet and the gap comprising flow diversion elements that direct fluid flow longitudinally along the gap, circumferentially around the gap, or both.

An important feature of the system of the invention is the use of flow paths in the filtration head that have diameters close to, or the same as, those of the inlet and outlet opening, and desirably, as the inlet and outlet piping. This increases the conductance of fluid flowing through the device, and allows greater throughput at lower pressure drop.

In addition to the disposability of the sump assembly, the modularity of the system allows it to be disposed in a variety of flow patterns, including both series and parallel, without modifying the existing piping of the system, simply by rotating the purification head/sump within a mounting bracket. To this end, in one embodiment, the invention also includes a mounting bracket comprising:

a mounting surface that substantially corresponds to a surface supporting the purification system, and a support ring rigidly attached to the mounting surface and extending therefrom at an angle to the mounting surface, wherein the support ring comprises an opening therein adapted to receive the purification head assembly, wherein the purification head assembly can be rotated within the support ring to different circumferential positions.

An important part of the purification system of the invention is the flow dispersal plate. This plate contains essentially three features: a substantially planar fluid distribution portion, which takes incoming fluid to be filtered and spreads it out, moving it outward toward the circumference of the purification sump assembly; a flow diverting portion, for directing the fluid flow at least longitudinally along the gap between the fluid purification media and the sump wall, and desirably providing a circumferential velocity component as well; and a central opening for returning purified fluid to the system without contact with the fluid in the substantially planar flow distribution portion. These flow diverting portions may include a plurality of angled vanes around the outer edge of the flow distribution portion, or a plurality of angled, substantially longitudinal, holes in the outer edge of the flow distribution portion.

The purification system of the invention is highly modular and readily adaptable to a variety of configurations without the need for repiping or doing significant plumbing at the site of the installation when the configuration of the system is changed. Moreover, the purification system lends itself to the use of a variety of purification techniques: the fluid purification media can contain a variety of different purification materials. Nonlimiting examples include activated carbon (either granular or in the form of a carbon block with polymeric resin binder), zeolite, titanium oxides, reverse osmosis membranes, and the like. Two or more of these may be combined into a single cartridge or they may be disposed in separate cartridges in separate purification apparatuses that are connected in series or parallel, or some combination thereof An optional feature of the purification system of the invention is the flexible clips used to secure system piping and/or adapters to the purification head assembly. These clips help to provide a water-tight connection, while at the same time providing easy change-out of system components. They contain a main body section having two end portions and a middle portion;

a pair of flexible extending sections extending from each of the end portions of the main body section substantially normal thereto;

a central extending section extending from the middle portion of the main body section substantially normal thereto;

wherein each of the flexible extending sections and the central extending section define an opening adapted to receive an outer surface of a conduit.

BRIEF DESCRIPTION OF DRAWINGS

FIG. 11 is a schematic view of two arrangements of purification apparatuses according to the invention. FIG. 11A shows the apparatuses arranged for parallel flow, while

DETAILED DESCRIPTION OF SPECIFIC EMBODIMENTS

The purification system of the invention will be described with respect to certain specific embodiments, which description is intended to aid in understanding of the invention, and not to limit the scope of the claims.

Figure 1A:
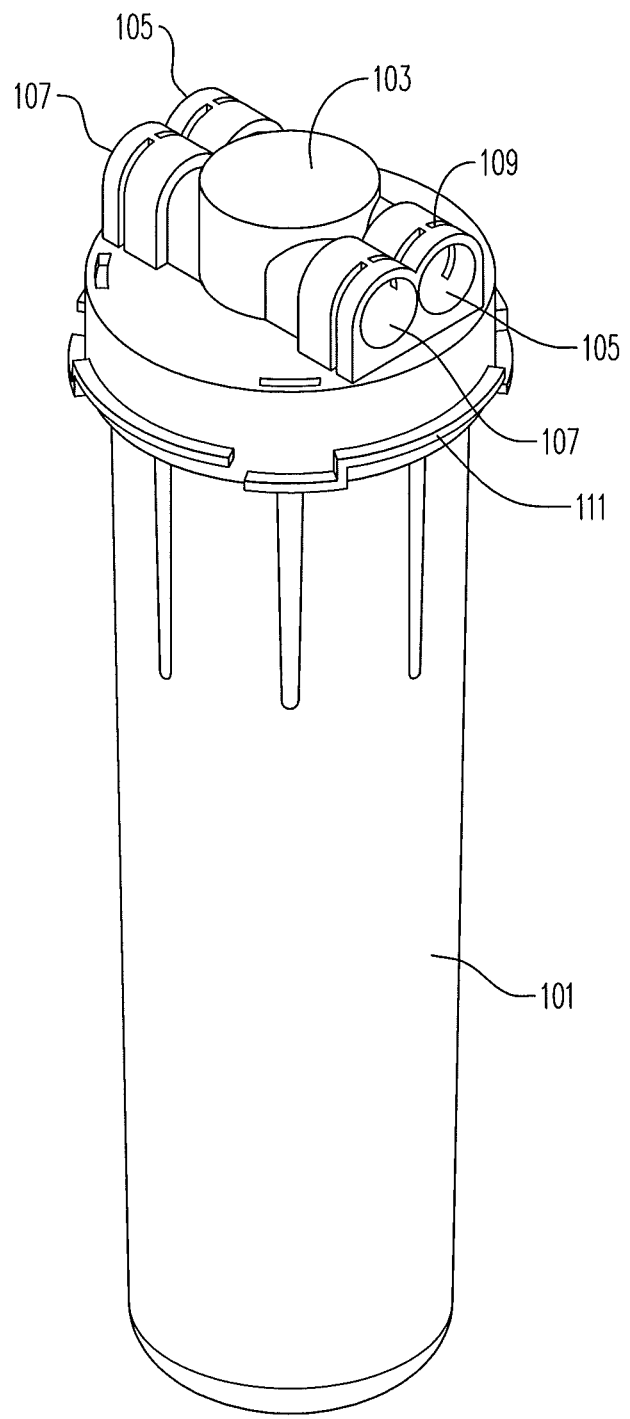
FIG. 1A is a perspective view of one embodiment of the purification system of the invention.
Figure 1B:
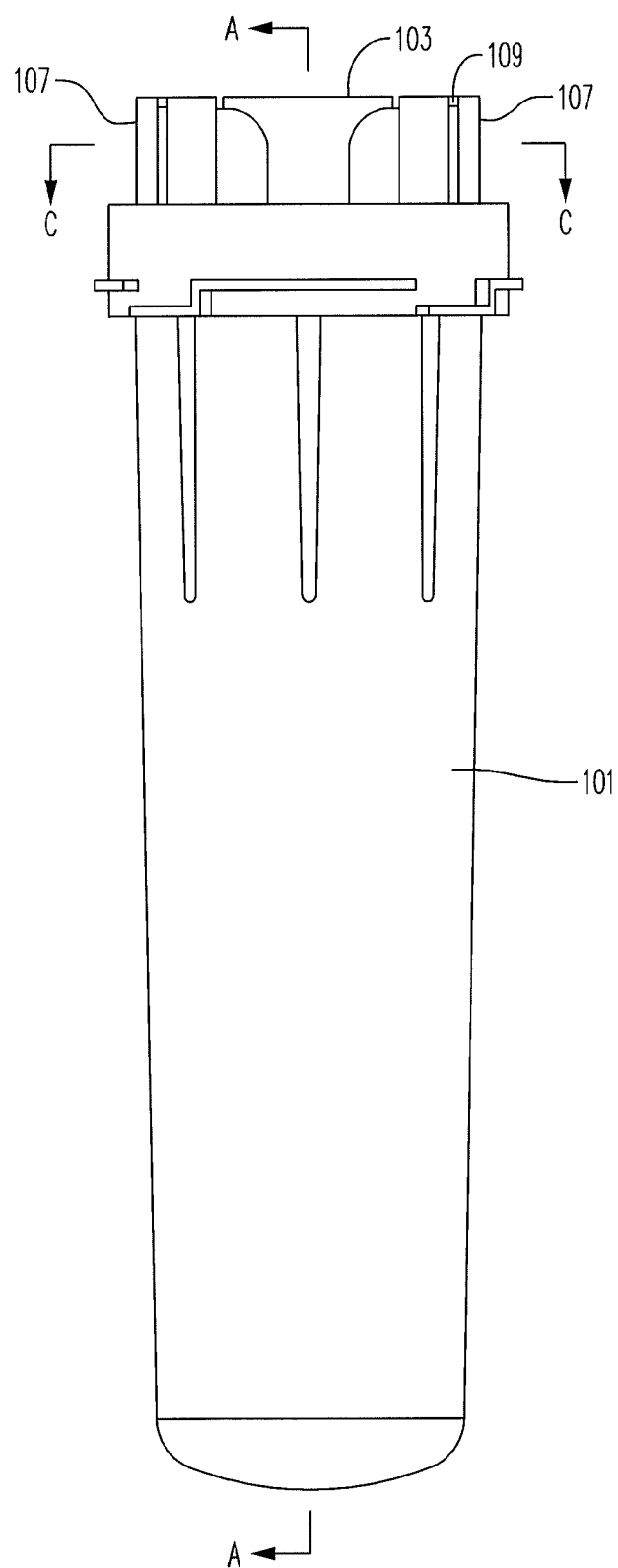
FIG. 1B is a side plan view of the embodiment of the purification system of the invention shown in FIG. 1A.
Figure 1C:
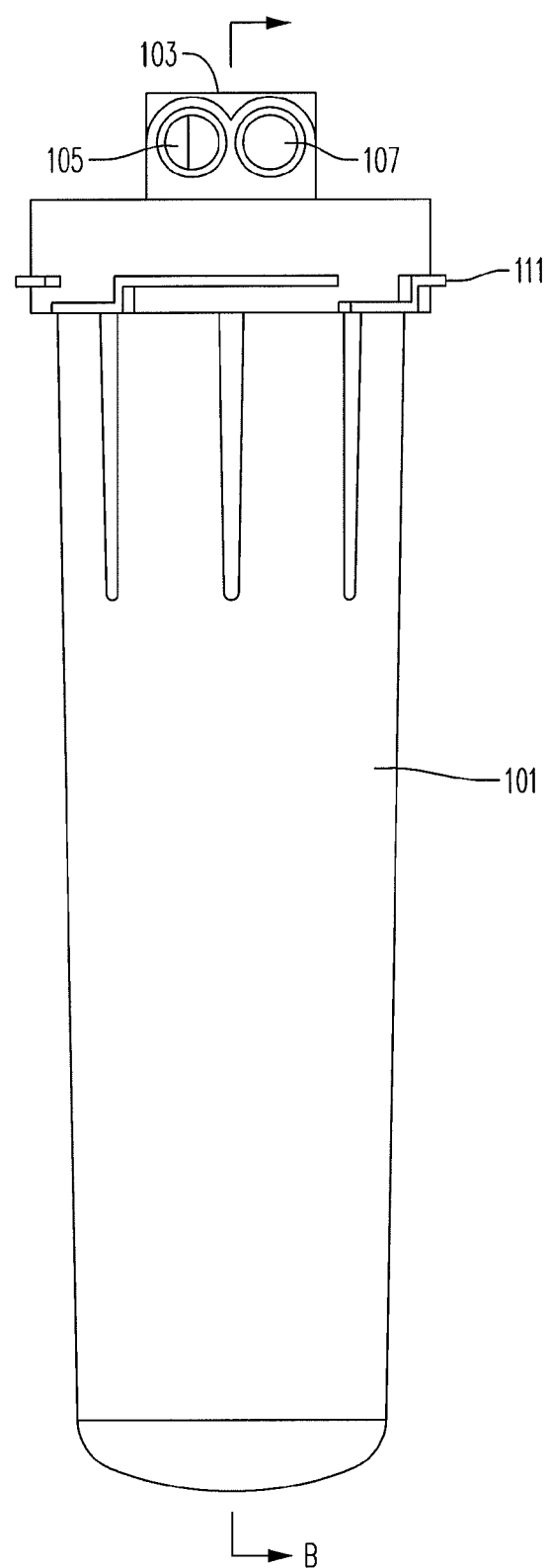
FIG. 1C is a front plan view of the embodiment of the purification system of the invention shown in FIGS. 1A and 1B.

FIG. 1A is a perspective view, and FIGS. 1B and 1C are side and front plan views, respectively, of one embodiment of the purification system of the invention. Sump 101 is adapted to contain a purification media cartridge (not shown), and is typically made of polymer (such as polyolefins (e.g., LDPE, HDPE, polypropylene, polybutylene, etc.), polyamides (e.g., nylons), polyesters (e.g., PET), and the like) or other lightweight, disposable material. The sump is designed to be disposable along with the purification media cartridge, so that maintaining the purification system does not require disassembly of the media from the sump, handling of the media, etc. This eliminates the need for maintenance personnel to handle unsanitary, contaminated media. Sump 101 is detachably connected to purification head 103, which contains inlet openings 105 and outlet openings 107. FIG. 1 shows optional clip insertion slots 109, adapted to receive retaining clips (not shown) for securing fittings (not shown) that connect piping or conduits to the purification system. The retaining clips and fittings are described in more detail herein. Purification head 103 also contains circumferential detents 111, which are designed to allow purification head 103 (and attached sump 101) to be rotated within a mounting bracket by a fixed angular distance (usually multiples of 90 0).

Figure 2A:
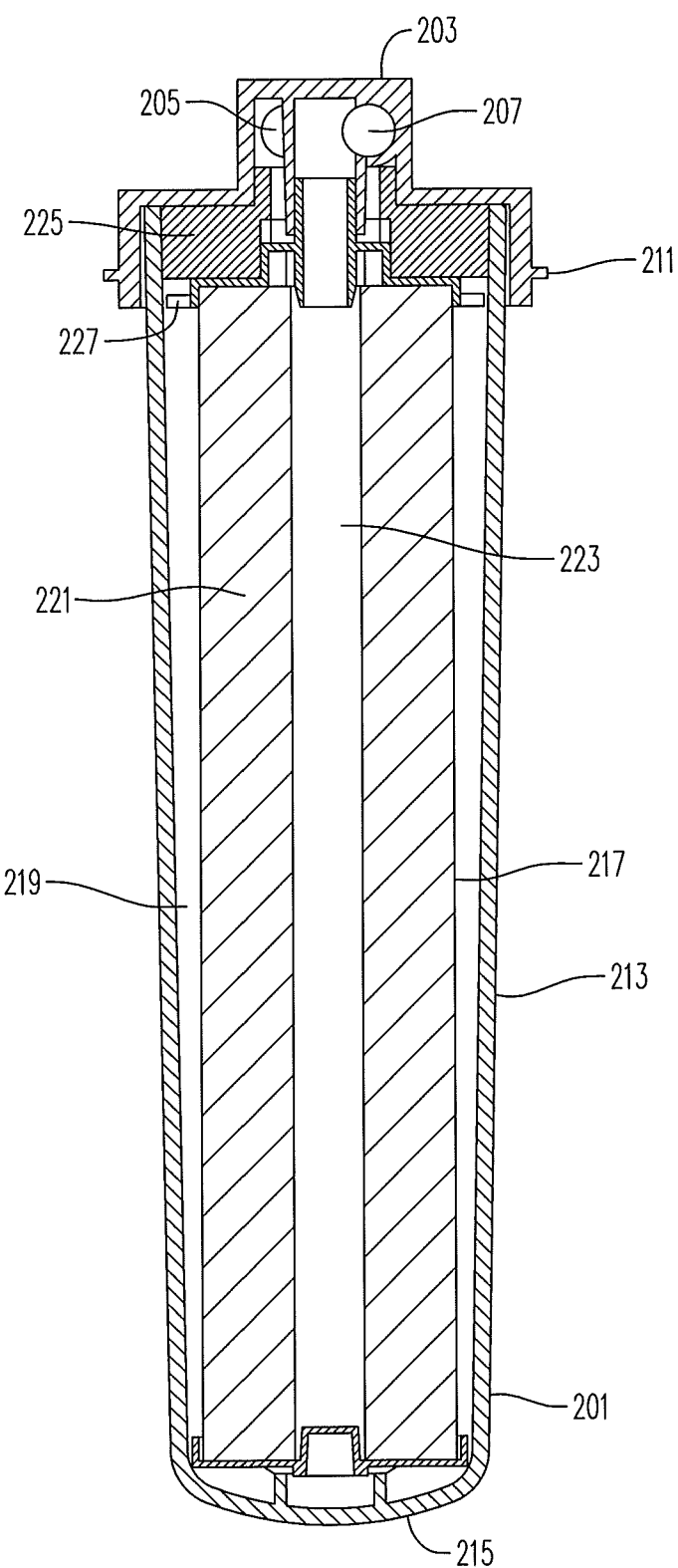
FIG. 2A is a sectional view of the embodiment of the purification system of the invention shown in FIG. 1 taken along section line A-A in FIG. 1B.
Figure 2B:
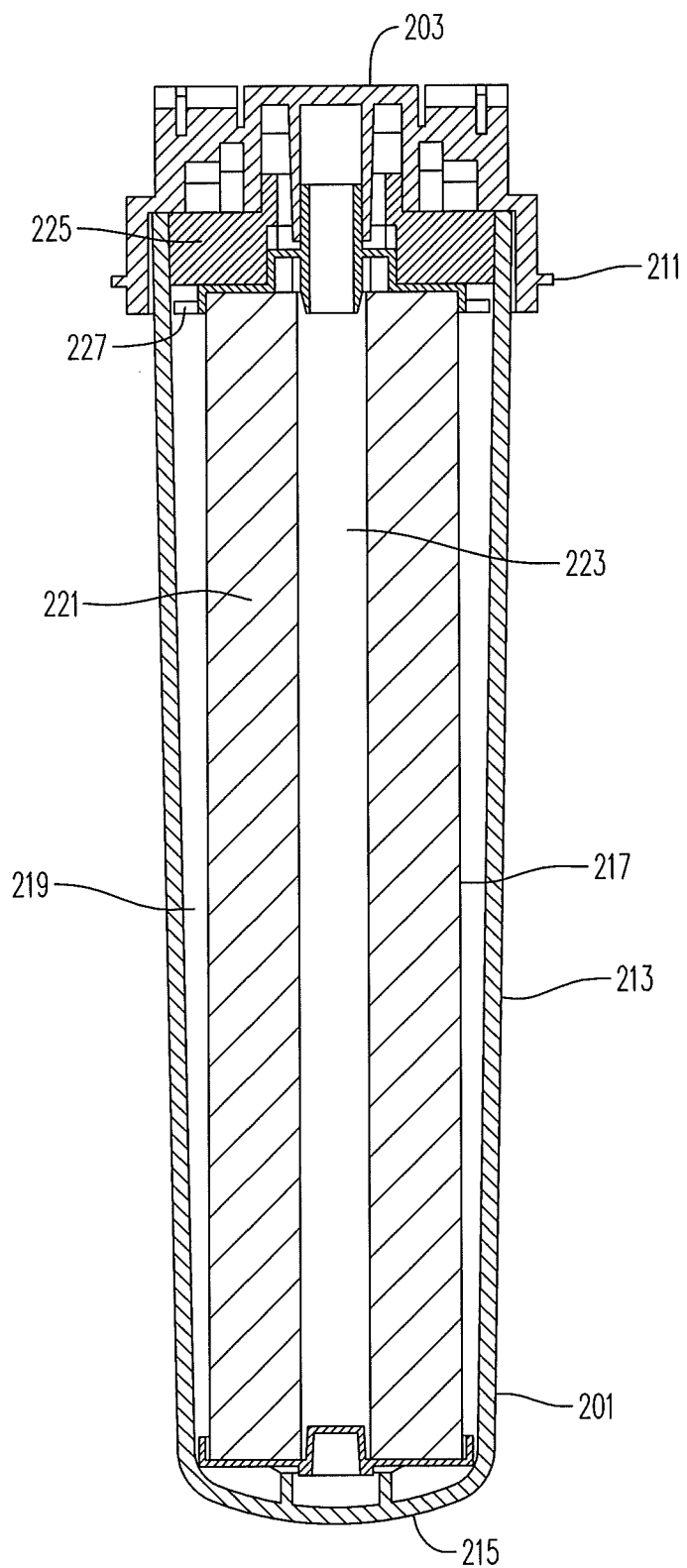
FIG. 2B is a sectional view of the embodiment of the purification system of the invention shown in FIG. 1-2 taken along section line B-B in FIG. 1C

FIG. 2A is a sectional view of the purification assembly shown in FIG. 1, taken along section line A-A in FIG. 1B. FIG. 2B is a sectional view of the purification assembly shown in FIG. 1 taken along section line B-B in FIG. 1C. Sump 201 contains a longitudinal side wall 213 and a bottom portion 215 located distally from purification head assembly 203 and integral with longitudinal side wall 213. Sump 201 contains purification media cartridge 217, which is displaced from the longitudinal side wall 213 a sufficient distance to create gap 219, through which unfiltered water can flow. Purification media cartridge 217 contains purification media 221, and defines a longitudinal central opening 223 through which filtered water can flow. As described above, sump 201 is detachably connected to purification head 203, and is designed and constructed so that sump 201 and purification media cartridge 217 can be disposed of together, without the need for separate handling of purification media cartridge 217.

Purification head 203 contains an inlet opening 205 that is in fluid communication with a chamber defined by housing end cap 225 and flow dispersal plate 227. Flow dispersal plate 227, which is a plate closely fitting between annular housing end cap 225 and purification media cartridge 217, contains openings therethrough that direct fluid into gap 219. These openings may be angled holes extending through the thickness of the plate, or angled vanes, in order to give the fluid both a circumferential velocity component and/or a radial velocity component, as well as a longitudinal velocity component. The circumferential and/or radial velocity components are believed to force fluid flow across more of the surface of the purification media cartridge, and to remove surface debris therefrom, reducing the dead zone phenomenon as well as reducing clogging of the purification media. Unfiltered fluid flowing into the gap 219 flows through the purification media cartridge 217, which is typically a porous monolithic or particulate material. Filtered fluid leaves the purification media 217 and flows toward the purification head 203 through longitudinal central opening 223, and leaves the purification system through outlet 207, which is connected to conduits that carry the water to its intended use, or to another purification step.

Figure 3A:
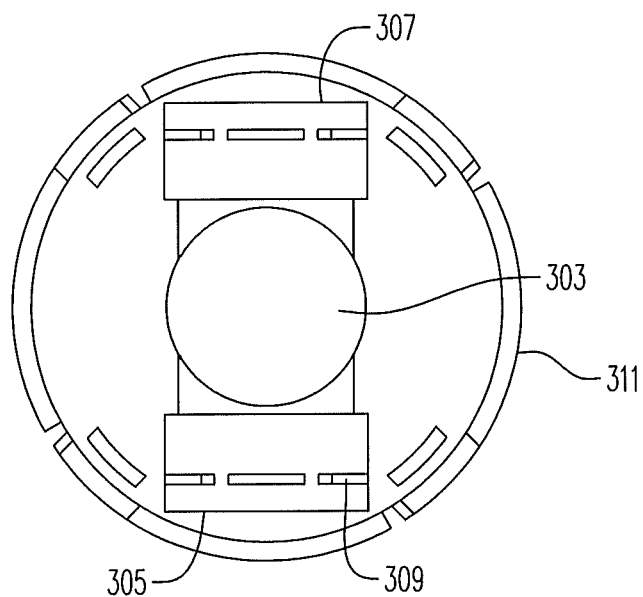
FIG. 3A is a top plan view of the embodiment of the purification system of the invention shown in FIG. 1-2.
Figure 3B:
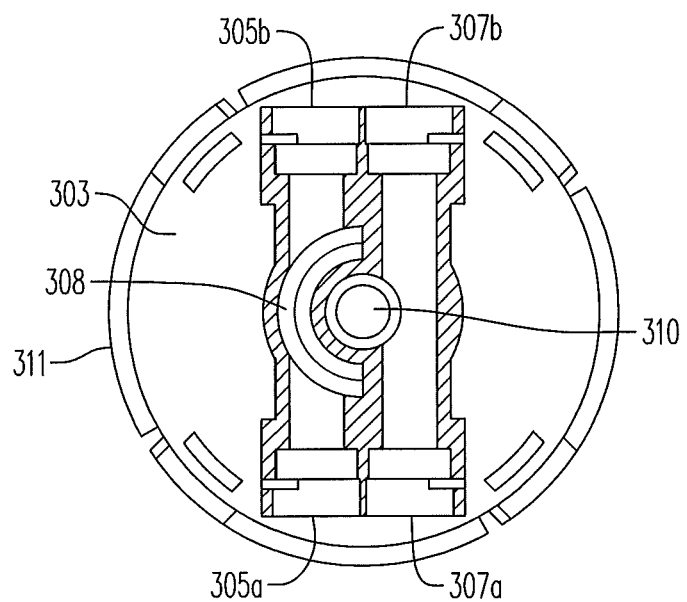
FIG. 3B is a sectional view of the embodiment of the purification system of the invention shown in FIG. 1-2 taken along section line C-C in FIG. 1B.

FIG. 3A is a top plan view and FIG. 3B a bottom sectional view along section line C-C of FIG. 1B of purification head 303. Unfiltered fluid is conducted to inlet 305 by conduits and connectors (not shown) held in place via clips (not shown) in slots 309. Similarly, filtered water exits the purification system through outlet 307. Detent 311 allows purification head 303 to rotate between fixed positions in a mounting bracket. Bottom sectional view FIG. 3B shows more detail of the flow paths inside purification head 303. Semicircular cutout 308 is in fluid communication with fluid inlet 305, and allows incoming unfiltered fluid to flow between fluid inlet 305 and gap 219, as explained in more detail herein. Longitudinal central opening 310 is in fluid communication with outlet 307, and allows filtered fluid to flow between longitudinal central opening 223 and outlet 307.

Figure 4:
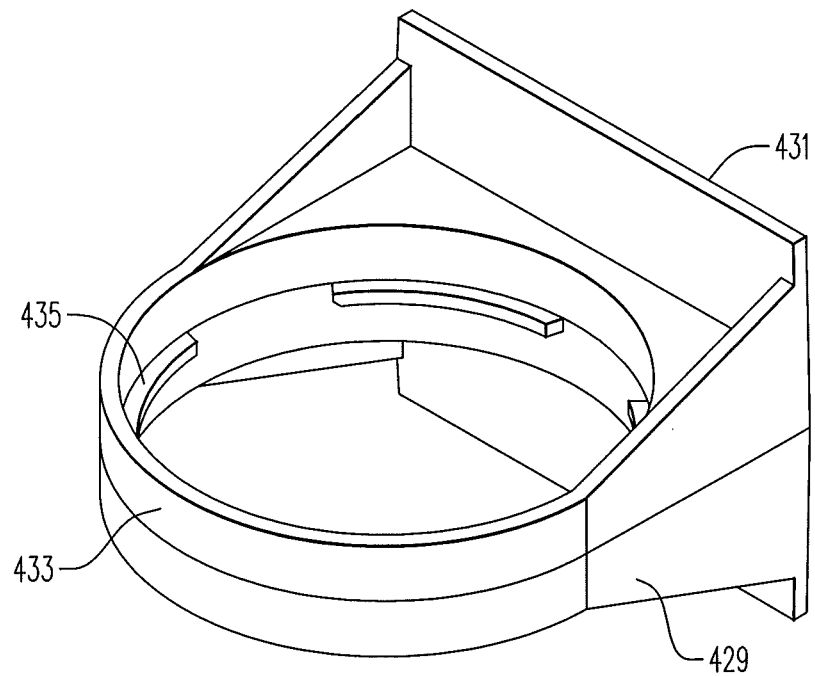
FIG. 4 is a perspective view of one embodiment of a mounting bracket, which optionally forms a part of the purification system of the invention.

FIG. 4 is a perspective view of one embodiment of a mounting bracket 429 which forms an optional part of the purification system of the invention. Mounting bracket 429 contains a mounting surface 431 that will correspond substantially to the surface that will support the purification assembly. If the supporting surface is flat, e.g., a flat wall, then the mounting surface 431 should be substantially flat. Curved supporting surfaces can be used, but the mounting surface should be curved as well. Mounting surface 431 is rigidly attached to support ring 433, which extends at an angle from mounting surface 431. Typically, support ring 433 will extend perpendicularly from mounting surface 431, but other angles are possible. Within support ring 433 are a plurality of spaced detents 435. These cooperate with detents 111 on purification head assembly to allow the purification head and sump to be rotated within the mounting bracket to different fixed positions.

This ability to rotate the purification head and sump between fixed positions without removal of the mounting bracket, combined with the presence of multiple available inlet and outlet openings in the purification head, allows maximum flexibility in configuring and modifying the purification system of the invention. For example, referring to FIG. 3B, the purification head can be configured for single device use by connecting an inlet flow pipe to inlet opening 305a and an outlet flow pipe to outlet opening 307b, and by plugging the other two available inlet and outlet openings (305b and 307a, respectively). This forces all of the fluid to pass through the purification media cartridge and be purified by the system. The fluid exiting outlet opening can be conducted to the inlet opening of a second purification system configured in the same way. All of the fluid will be purified by the second purification system, and the first and second systems are essentially connected in series.

Alternatively, a second purification system can be disposed after the first system in the fluid flow path, but not be used to purify fluid at a particular point in time. Such an arrangement might be desirably where it is necessary to have a back-up or reserve system ready for use if there is a problem with a primary system, or during changing of the sump/purification cartridge of the primary system.

Figure 5A:
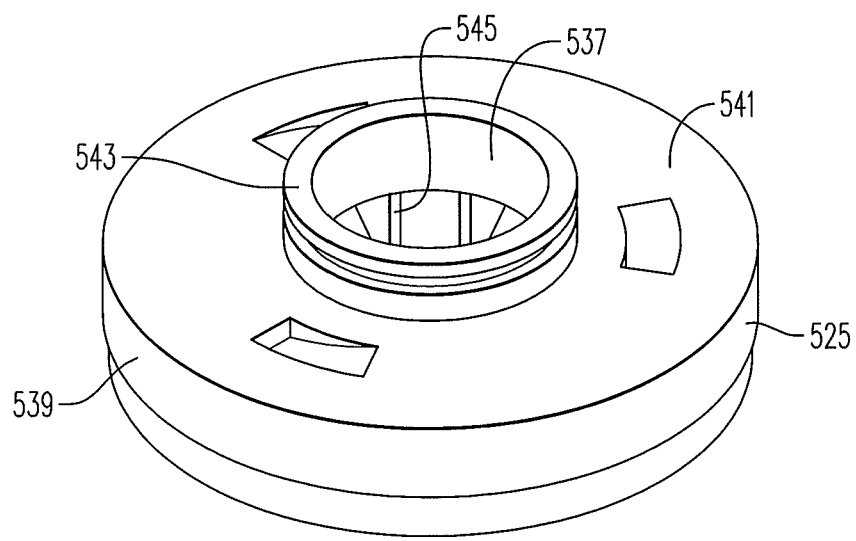
FIG. 5A is a perspective view of one embodiment of a housing end cap that forms a part of one embodiment of the purification system of the invention.

FIG. 5A is a perspective view of a housing end cap 525 that forms a part of one embodiment of the invention. The housing end cap 525 fits tightly onto the top of sump 101 (shown in FIG. 1) and seals within the sump 101 both purification media cartridge 221 and flow dispersal plate 227. Housing end cap 225 also helps to maintain separate flow paths for the unfiltered and filtered fluids, and helps to distribute and convey unfiltered fluid over the fluid dispersal plate. Housing end cap 525 contains a central opening 537, which permits unfiltered water to flow through the endcap and along its underside, and also accommodates a flow conduit from the longitudinal central opening 223 of the purification media cartridge 217 (as shown in FIG. 2). The housing end cap 525 also contains a generally, cylindrical wall portion 539 and a substantially planar portion 541 extending from a collar 543 that defines a portion of central opening 537. Along the underside of the substantially planar portion 541 are a series of circumferentially spaced radial vanes 545, which channel and distribute influent unfiltered fluid to the flow dispersal plate.

Figure 6A:
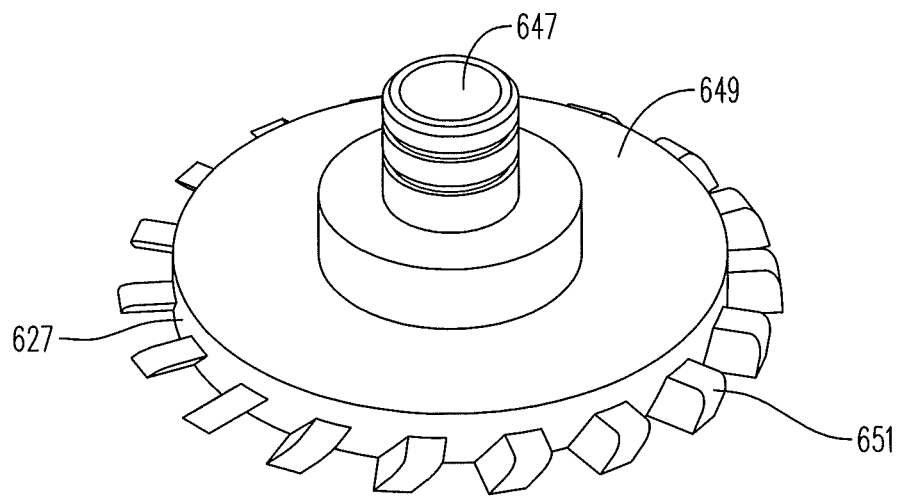
FIG. 6A is a perspective view of one embodiment of a flow dispersal plate that forms a part of one embodiment of the purification system of the invention.
Figure 6B:
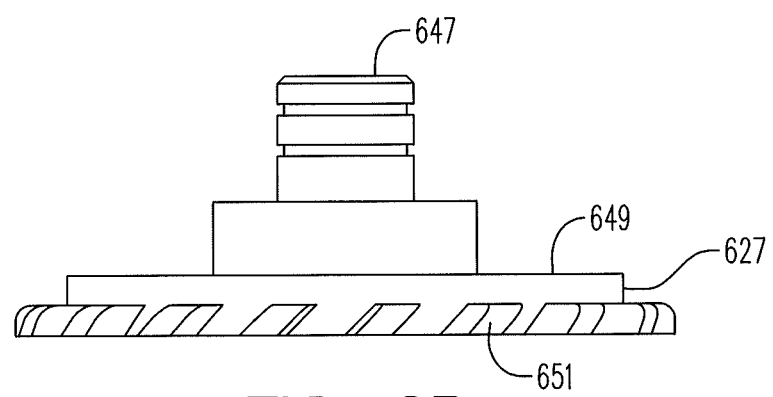
FIG. 6B is a side plan view of the flow dispersal plate of FIG. 6A.
Figure 6C:
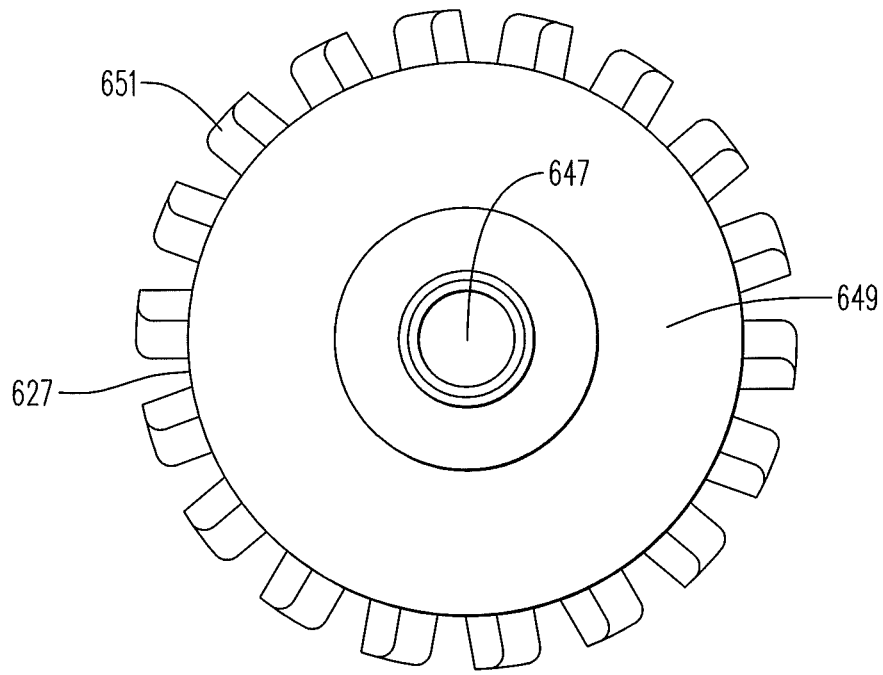
FIG. 6C is a top plan view of the flow dispersal plate of FIGS. 6A and 6B.
Figure 6D:
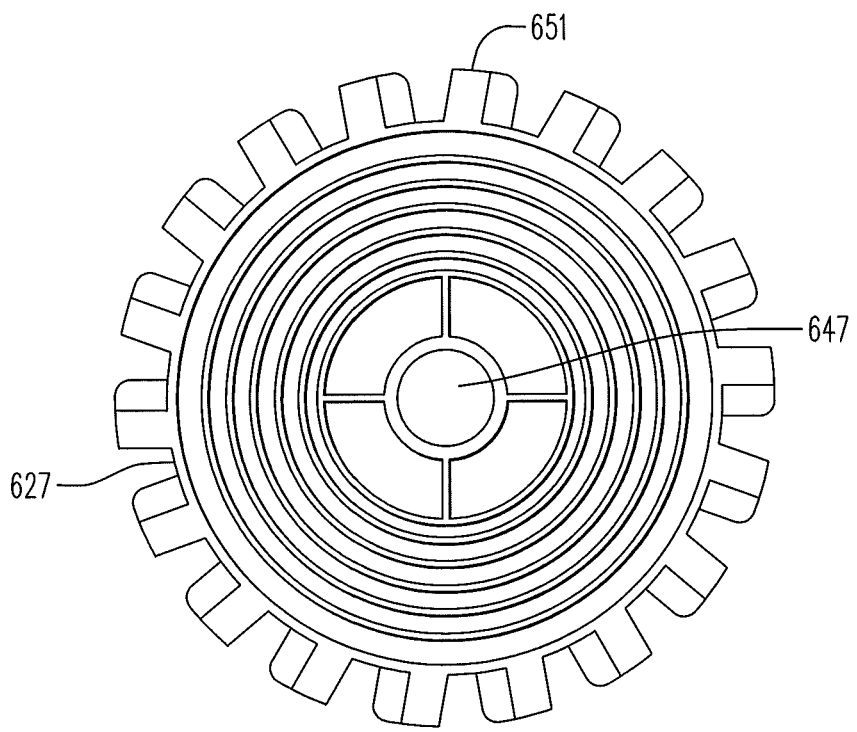
FIG. 6D is a bottom plan view of the flow dispersal plate of FIGS. 6A, 6B.

FIG. 6A provides a perspective view, and FIGS. 6B, 6C, and 6D provide side plan, top plan, and bottom plan views, respectively, of one embodiment of a flow dispersal plate 627 according to the invention. Flow dispersal plate 627 contains a central opening 647 adapted to be in fluid communication with central longitudinal opening 223 of purification media cartridge 217, and to fit within central opening 537 of housing end cap 525, thereby conducting filtered fluid from the purification media cartridge to the outlet 307 of purification head 303 (as shown in FIG. 3). Flow dispersal plate 627 also has a substantially planar flow distribution portion 649, which forms a flow channel with the underside of housing end cap 525 and the radial vanes 545 disposed thereon, conducting inflowing unfiltered fluid toward the gap 219 between the purification media cartridge 217 and substantially cylindrical wall 213 of sump 201. Unfiltered fluid passes over the edge of flow distribution portion 649, where it is directed into the gap by one or more flow dispersal members 651. As illustrated in FIG. 6A, these flow dispersal members may be angled vanes circumferentially spaced around the periphery of flow distribution portion 649. The vanes are angled so as to direct fluid flow both circumferentially around and axially (in the longitudinal direction) along the periphery of the purification media cartridge.

Without wishing to be bound by theory, it is believed that imparting a multidirectional flow to the unfiltered fluid reduces the occurrence of dead spots in the purification media cartridge, and prolongs its useful life. It is believe that the circumferential velocity component of the fluid causes it to scour the surface of the purification media cartridge, thereby preventing portions closest to the inlet from becoming unduly clogged with debris. In addition, it is believed that directing the flow along the longitudinal axis of the purification media cartridge helps to improve the flow characteristics of the sump, and to distribute the unfiltered fluid over more surface area of the purification media cartridge, again helping to avoid the formation of dead spots, as well as more efficiently utilizing the adsorption capacity of the purification media, and thereby extending its useful life. As the purification media capacity is used more efficiently (i.e., as unfiltered fluid is passed through a larger portion of the purification media cartridge), it will take a longer time before the purification media becomes completely loaded and must be discarded. This increase in purification media lifetime will more than offset any increase in cost (over existing purification apparatus) entailed by using a fully disposable sump.

Figure 5B:
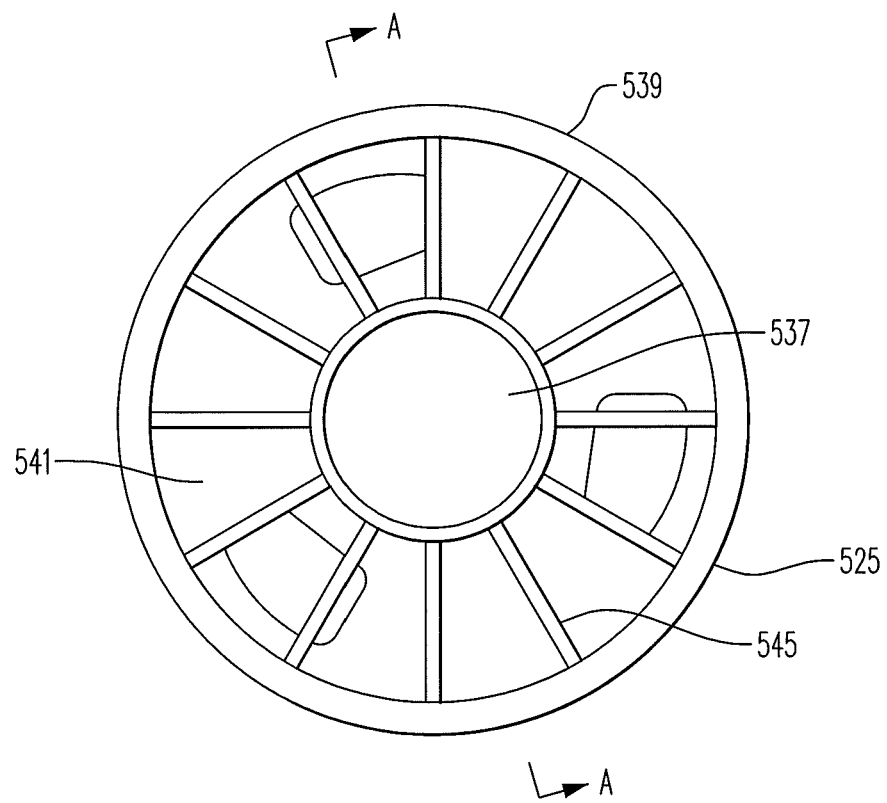
FIG. 5B is a bottom plan view of the housing end cap of FIG. 5A.
Figure 5C:
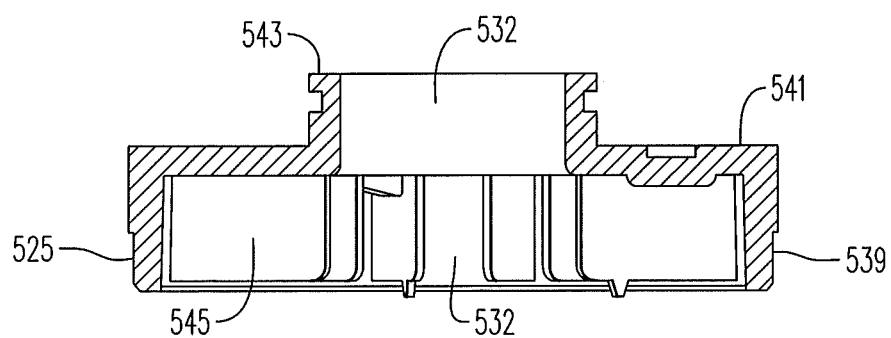
FIG. 5C is side sectional view of the housing end cap taken along section line A-A of FIG. 5B.
Figure 7A:
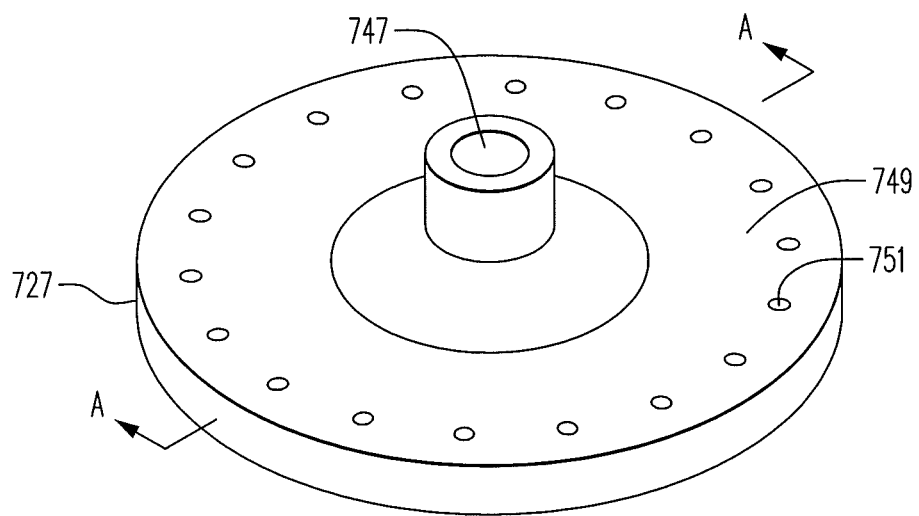
FIG. 7A is a perspective view of another embodiment of a flow dispersal plate of one embodiment of a purification system of the invention.
Figure 7B:
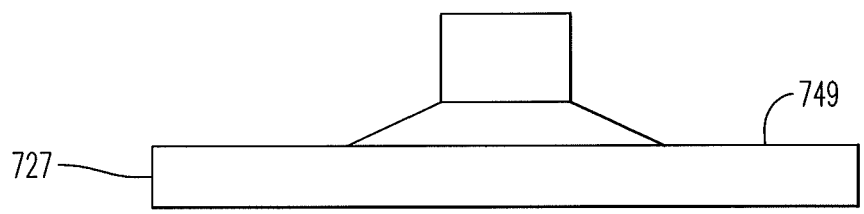
FIG. 7B is a side plan view of the flow dispersal plate of FIG. 7A.
Figure 7C:
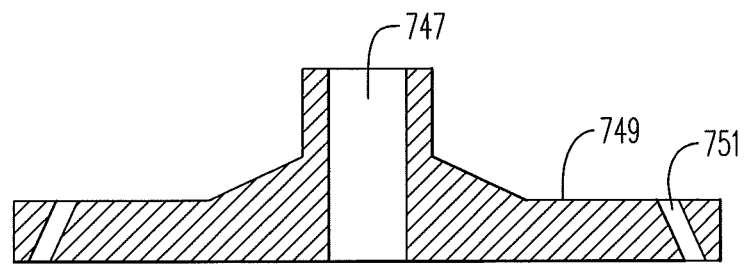
FIG. 7C is a sectional view of the flow dispersal plate of FIGS. 7A and 7B, taken along section line A-A in FIG. 7B.

Alternative designs for the flow dispersal plate are also contemplated and are within the scope of the invention. Any geometry that is capable of conducting fluid from the housing end cap to the gap 219 (shown in FIG. 2), and of then imparting at least a longitudinal, and desirably also a circumferential, velocity component to the fluid, is within the scope of the invention. Representative alternative geometries include a perforated plate, such as that show in FIGS. 7A, 7B, and 7C, which are perspective, side plan, and sectional views of an alternative flow dispersal plate 727. Filtered water is conducted away from the longitudinal central opening 223 of purification media cartridge 217 (shown in FIG. 2) by central opening 747, which fits into central opening 537 of housing end cap 525 (shown in FIG. 5). Inflowing, unfiltered fluid is conducted toward gap 219 (shown in FIG. 2) by substantially planar portion 749. As the fluid approaches the periphery of substantially planar portion 749, it is conducted through a series of circumferentially spaced angled perforations 751, which direct the fluid downward into gap 219. The perforations can be angled outwardly, as shown in FIG. 7C, inwardly, laterally, or some combination of these, so as to impart multiple velocity components to the fluid as it enters gap 219. These different velocity components help to scour debris from the region of the purification media cartridge close to the inlet, as welt as to direct the fluid toward otherwise underutilized regions of the purification media. As with the embodiment of the fluid dispersal plate shown in FIG. 6, the embodiment shown in FIG. 7 helps to more efficiently utilize the capacity of the purification media, and to increase its useful life, offsetting the costs involved in using a fully disposable sump and purification cartridge combination.

An additional feature of certain embodiments of purification assembly according to this invention is the use of consistent inner diameter openings throughout the apparatus. This reduces the effective number of orifices in the system, greatly increasing the fluid conductance of the system, and thus the flow rates achievable for a given pressure drop. For example, using ¾ inch openings throughout the apparatus allows the purification system of the invention to achieve flow rates as high as 30 gpm for a pressure drop of no more than 10 psi (without purification media cartridge).

Figure 8A:
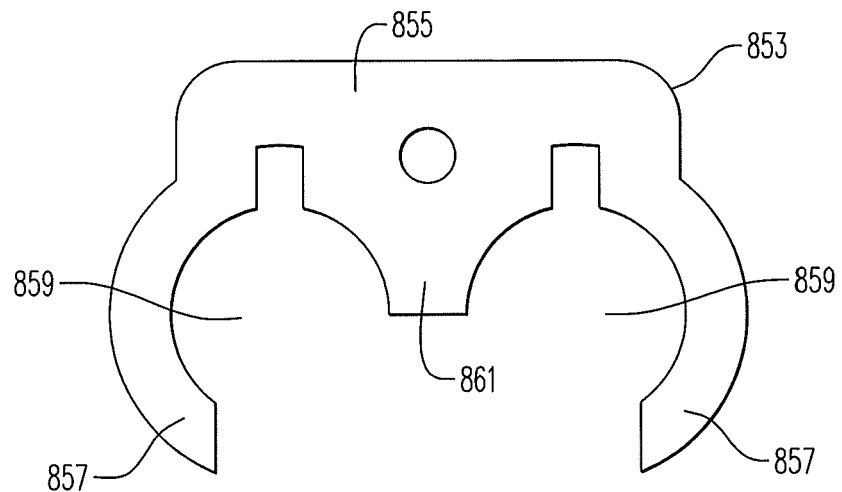
FIG. 8A and FIG. 8B are a plan view and a perspective view, respectively, of one embodiment of a clamp used to secure inflow and outflow line adapters to the purification head, in one embodiment of the invention.
Figure 8B:
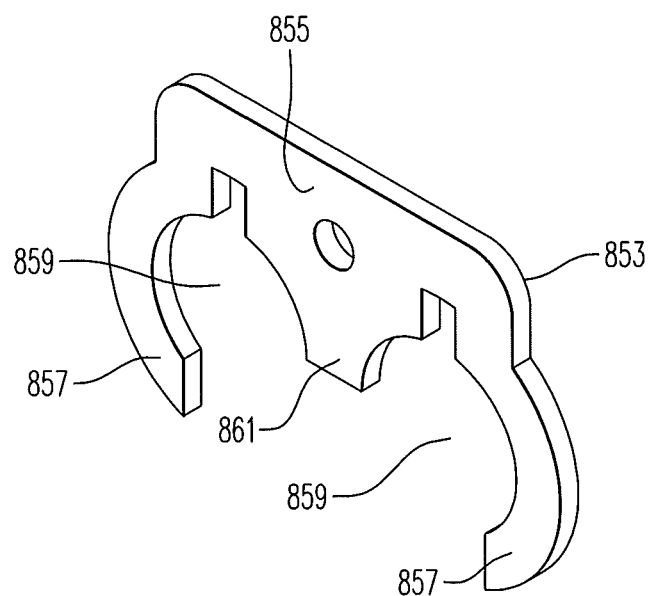

The purification system of the invention possesses a high degree of modularity. First, as mentioned above, the sump, purification media cartridge, flow dispersal plate, and housing end cap fully replaceable and disposable as a single unit. Additionally, in one embodiment of the system, connection to inflow and outflow lines can be made by a series of connectors and adapters secured to the purification head by special flat clips, shown in FIG. 8. FIG. 8A shows a plan view of the clip 853, which is designed to slide into clip insertion slots 109 in FIG. 1. Clip 853 contains main body portion 855 and extending portions that extend transverse to the main body portion. In the illustrated embodiment, these extending portions include two long extending portions 857, which are flexible, extend from the ends of main body portion 855, and are adapted to receive and hold connectors or adapters, connected to the inflow and outflow piping, into openings 859. Clip 853, as illustrated, also contains short extending portion 861, which also extends from the central region of main body portion 855, and which also helps to receive and hold connectors or adapters connected to the inflow and outflow piping. Also included within the scope of the invention are clips having a single long extending portion extending from the central region of main body portion 855, and two short extending portions that extend from the ends of main body portion 855. The clips are easy to engage and disengage, as they are typically made from a flexible polymeric material. To engage the clips, the connector or adapter is inserted into the purification head and the clip is inserted into the clip insertion slots. The extending portions are displaced outwardly until they spring back into place around the connector or adapter. The curvature of opening 859 of the clip matches the outer curvature of the connector or adapter, so that once the clip has been inserted, it secures the connector or adapter to the purification head in a water-tight fit. Disconnection of the connector or adapter is accomplished by simply pulling on the main body of the clip, again forcing extending portions around the adapter or connector, then removing the adapter or connector from the purification head.

Figure 9A:
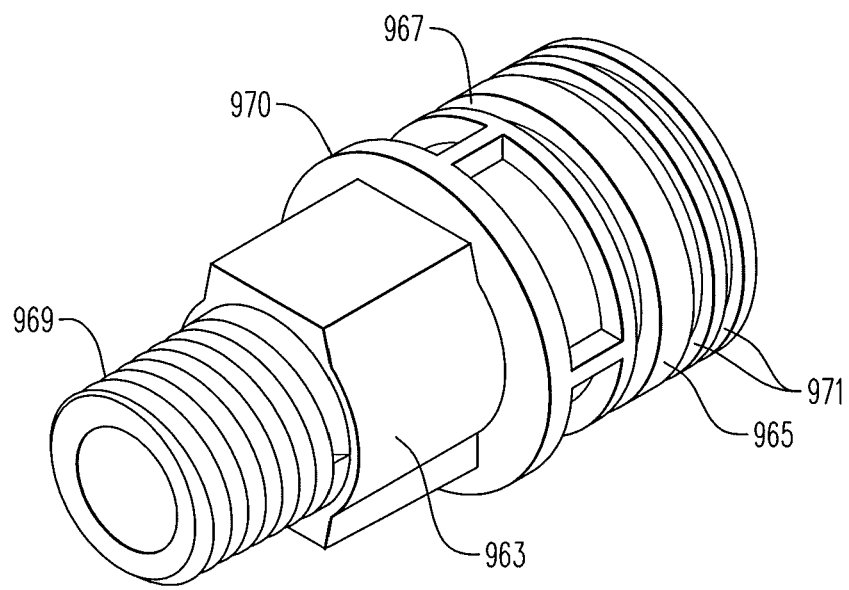
FIG. 9A and FIG. 9B are a perspective view and a side plan view, respectively, of a one embodiment of a connector according to the present invention.
Figure 9B:
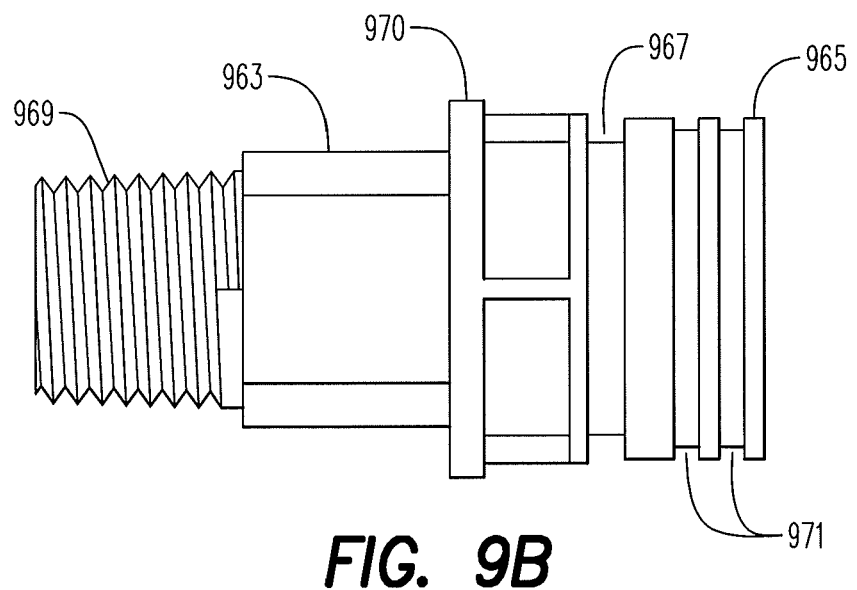
Figure 10:
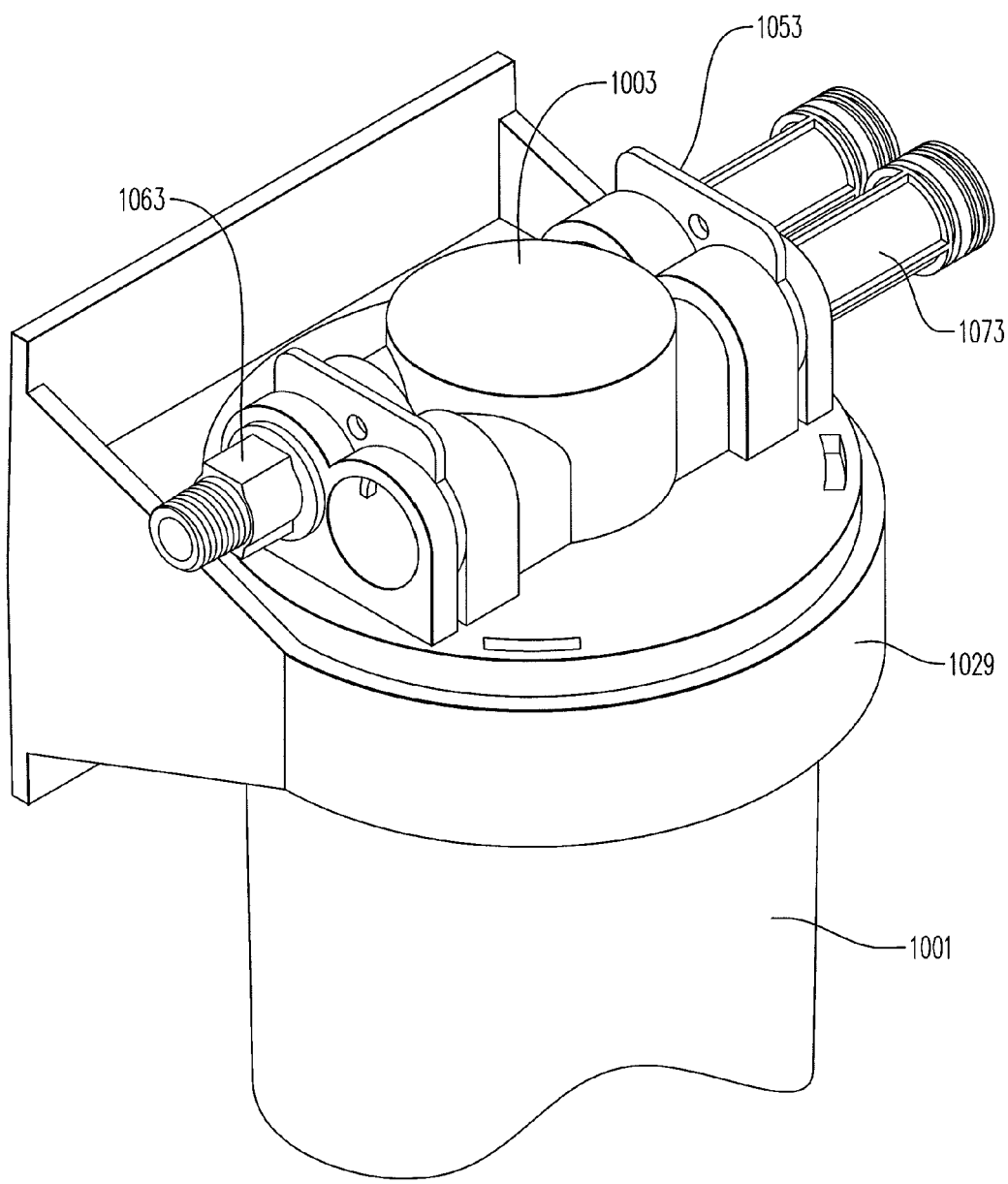
FIG. 10 is a perspective view of a portion of an assembled purification system according to one embodiment of the invention.

The function of the connector or adapter and its interaction with the clip and the purification head can be understood better by reference to FIG. 9A, FIG. 9B, and FIG. 10. FIG. 9A and FIG. 9B are perspective and side plan views of a particular adapter or connector 963 according to one embodiment of the invention. This adapter contains a threaded portion 969, adapted to connect to inflow or outflow piping. The adapter also contains an insertion portion 965 to be inserted into the purification head. Portion 965 contains an annular indent 967 adapted to fit into opening 859 of clip 853. Adapter 963 also contains a flange 970, and annular openings 971 suitable to receive polymeric O-rings, both of which function to help create a water-tight seal with the purification head. Other forms of connector or adapter can also be used, including those having insertion portions 965 at both ends and illustrated in FIG. 10 as connector 1073, or those having a barrier within the adapter to prevent water from flowing therethrough, as described in more detail below. Such connectors can be used to link multiple purification apparatus in series or parallel, as described in more detail below.

FIG. 10 illustrates how the purification head 1003, sump 1001, clip 1053, adapters 1063 and 1073, and mounting bracket 1029 are used together in an embodiment of a purification system according to the invention.

As described above, the purification system according to the invention is highly modular, and can be readily adapted to service a variety of water purification installations. Often, it will be necessary or desirable to use multiple purification media cartridge/sump assemblies to treat water. This may be because different purification cartridges are better adapted to remove specific impurities, and the inflowing water contains multiple impurities to be removed. Multiple treatments may also be necessary when the inflowing water is so highly contaminated that several passes through a purification apparatus are necessary to achieve a desired purity level. It may also be necessary to use several purification media cartridges when the volume of water to be purified is so high that a single purification media cartridge could not process it at an acceptable flow rate. Examples of two simple methods for linking multiple purification assemblies are shown schematically in FIG. 11A and FIG. 11B.

Figure 11A:
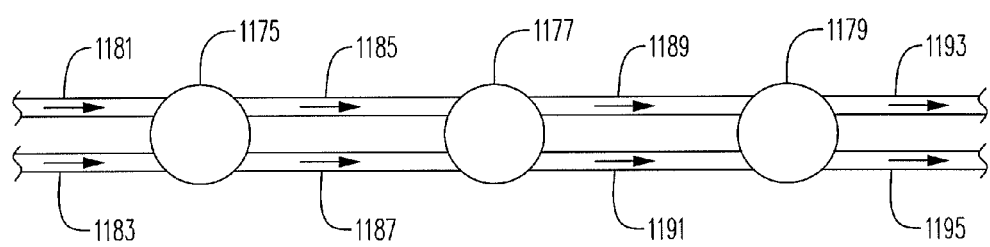

FIG. 11A illustrates a parallel flow arrangement, which might be desirable for treating large volumes of water for moderate contamination. One or more inlet pipes 1181 and 1183 bring water to be purified to first purification system 1175. A portion of this incoming water passes through the purification media cartridge contained in purification system 1175 and passes out of the system through outlet pipe 1187. The portion of water that does not pass through the purification media cartridge of first purification system 1175, i.e., a bypass stream, will leave the system through outlet pipe 1185. Both outlet pipe 1187 and outlet pipe 1185 pass water to second purification system 1177, where a portion of the water coming from pipe 1185 passes through the purification media cartridge of purification system 1177, and a portion bypasses the cartridge and flows out of the system. Water leaves purification system 1177 through outlet pipes 1189 and 1191, and is conveyed to third purification system 1179, where a portion of the incoming water passes through the purification media cartridge of that purification system and a portion flows out of the system bypassing the cartridge. Water leaves the purification system through outlet pipes 1193 and 1195.

Figure 11B:
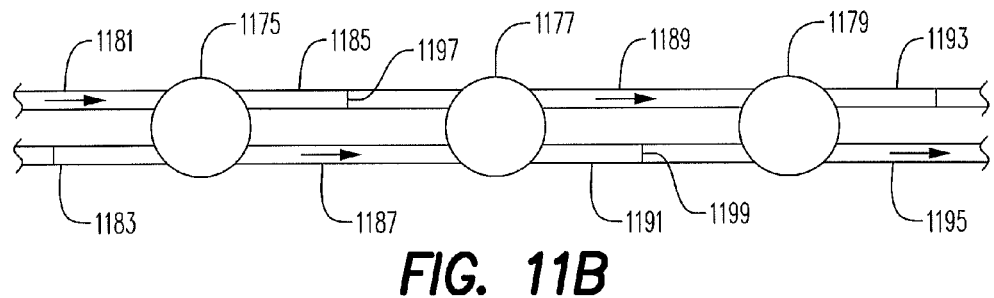
FIG. 11B shows the apparatuses arranged for series flow.

FIG. 11B illustrates a series flow arrangement, which would be suitable for treating heavily contaminated water, or water where high levels of purity are required, or water contaminated with species best removable using a variety of different purification media. Water enters first purification system 1175 through inlet 1181. Outlet 1185 is blocked with a blocking connector 1197. This forces all of the incoming water through the purification media cartridge of purification system 1175 and out through outlet 1187. This water then flows into the inlet of second purification system 1177, where it passes through the purification media cartridge of second purification system 1177 and out through outlet 1189, because outlet bypass 1191 is blocked by blocking connector 1199. The water then flows into third purification system 1179, where it is forced through the purification media cartridge and out through outlet 1195 (because outlet/bypass 1193 is blocked with a blocking connector). The modularity of the purification system of the invention allows it to be easily converted from one flow scheme to another simply by rotating the sump/purification head assembly of second purification system 1177 within the mounting bracket, as described above, and inserting or removing a blocking connector using the flexible clips, also described above.

Although both flow scheme embodiments have been illustrated in FIG. 11 using three purification systems, it will be recognized by those skilled in the art that the same flow schemes could be carried out using fewer or more purification systems. The purification media cartridges in each may be the same or different. Moreover, other arrangements can be easily imagined and implemented by suitable introduction of blocking connectors and rotation of the purification head/sump assemblies. These arrangements are also considered to be within the scope of the invention.

Figure 12A:
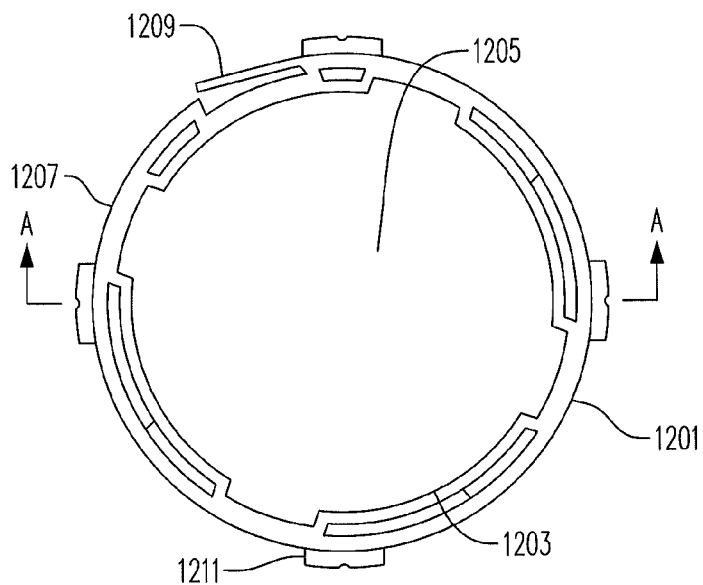
FIGS. 12A, 12B, and 12C are a top, side sectional, and bottom view, respectively, of a spacer ring for disposing undersized purification media cartridges in the purification apparatus of the invention.
Figure 12B:
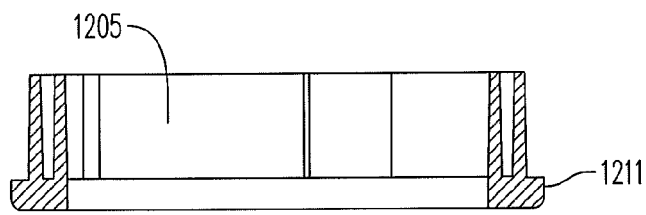
Figure 12C:
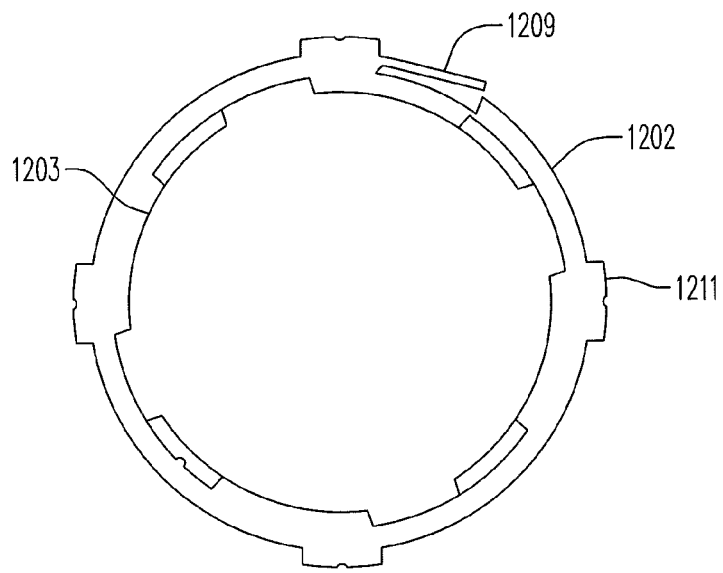

An optional element of the purification system of the invention is the filtration media cartridge spacer ring, shown in FIG. 12A, FIG. 12B, and FIG. 12C, and which functions as an adapter collar, allowing undersized purification media cartridges to be used in a sump designed for a larger purification media cartridge. The spacer ring fits between the outer surface of the purification media cartridge and the inner surface of the sump wall, immobilizing the purification media cartridge in the proper position to maintain flow stream integrity and allow the purification assembly to function with a smaller cartridge. FIG. 12A shows a top view of the spacer ring 1201 having inner surfaces 1203 adapted to contact the outer surface of the purification media cartridge, which fits within inner space 1205. Lugs 1211 disposed on outer surface 1207 of spacer ring 1201 contact the inner surface of the sump. Flexible flap 1209 exerts outward pressure against the sump wall, helping to keep the spacer ring 1201 positioned properly. FIG. 12B shows a side sectional view taken along line A-A in FIG. 12A. FIG. 12B is a bottom view of spacer ring 1201.

What is claimed is:

1. A purification system comprising:
 a purification head assembly detachably connected to a sump, comprising:
 a plurality of fluid inlets in fluid communication with the sump;
 a plurality of fluid outlets in fluid communication with the sump;
 a first clip for securing a pair of flow conduits selected from a group consisting of a plurality of inlet flow conduits and a plurality of outlet flow conduits to the fluid inlets and fluid outlets of the purification head assembly, comprising:
 a main body section extending longitudinally from a first end portion to a second end portion and having a middle portion therebetween;
 a first flexible extending section and a second flexible extending section extending laterally from the first and second end portions, respectively, of the main body section substantially normal thereto;
 a central extending section extending from the middle portion of the main body section substantially normal thereto having two arcuate sides extending laterally from the main body section, and a straight edge extending longitudinally at an end therebetween;
 wherein the first flexible extending section and the central extending section define a first opening being semicircular and adapted to receive an outer surface of one of the pair of the flow conduits having a circular cross-section and the second flexible extending section and the central extending section define a second opening being semicircular and adapted to receive an outer surface of the other of the pair of the flow conduits having a circular cross-section and the curvature of each of the openings matches an outer curvature of each of the flow conduits;
 wherein the first flexible extending section extends longitudinally away from and arcuately back toward the central extending section and radially outwardly from the first opening to define a first width and extending to a first tip having a laterally extending straight edge while maintaining the first width to the straight edge of the first tip, and the second flexible extending section extends longitudinally away from and arcuately back toward the central extending section and radially outwardly from the second opening to define a second width and extending to a second tip having a laterally extending straight edge while maintaining the second width to the straight edge of the second tip;
 wherein the first flexible extending section, the second flexible extending section, and the central extending section have a sufficiently small thickness to be received by a clip insertion slot in the purification head assembly of the purification system by insertion into the clip insertion slot, and to be removed from the clip insertion slot in the purification head assembly by simply pulling on the main body.

2. The purification system of claim 1, wherein the arcuate sides are smooth.

3. The purification system of claim 1, wherein the first end portion, second end portion, and middle portion are in the same plane.

4. The purification system of claim 1, comprising:
 a second clip for securing another pair of flow conduits to the purification head assembly.

5. The purification system of claim 4, wherein the first clip and the second clip are disposed on opposite portions of the purification head assembly.

6. The purification system of claim 1, wherein the flexible extending sections of the first clip extend laterally away from said main body section further than the central extending section.

7. The purification system of claim 1, wherein the main body section defines a first notch extending laterally into the main body section and open to the first opening and a second notch extending laterally into the main body section and open to the second opening.

8. A purification system comprising:
 a purification head assembly detachably connected to a sump, comprising:
 a plurality of fluid inlets in fluid communication with the sump;
 a plurality of fluid outlets in fluid communication with the sump;
 a first clip for securing a pair of flow conduits selected from a group consisting of a plurality of inlet flow conduits and a plurality of outlet flow conduits to the fluid inlets and fluid outlets of the purification head assembly, comprising:
 a main body section extending longitudinally from a first end portion to a second end portion and having a middle portion therebetween;
 a first flexible extending section and a second flexible extending section extending laterally from the first and second end portions, respectively, of the main body section substantially normal thereto;
 a central extending section extending from the middle portion of the main body section substantially normal thereto having two arcuate sides extending laterally from the main body section, and a straight edge extending longitudinally at an end therebetween;
 wherein the first flexible extending section, the second flexible extending section, and the central extending section have a sufficiently small thickness to be received by a clip insertion slot in the purification head assembly of the purification system by insertion into the clip insertion slot, and to be removed from the clip insertion slot in the purification head assembly by simply pulling on the main body;
 wherein the first flexible extending section extends longitudinally away from and arcuately back toward the central extending section and the first flexible extending section and the central extending section define an opening being semicircular and adapted to receive an outer surface of one of the pair of the flow conduits having a circular cross-section at a first area of contact defined between the opening and the outer surface of one of the pair of flow conduits over the entire thickness of the first flexible extending section, and the second flexible extending section extends longitudinally away from and arcuately back toward the central extending section and the second flexible extending section and the central extending section define another opening being semicircular and adapted to receive an outer surface of the other of the pair of the flow conduits having a circular cross-section at a second area of contact defined between the opening and the outer surface of the other of the pair of flow conduits over the entire thickness of the second flexible extending section and the curvature of each of the openings matches an outer curvature of the outer surface of each of the flow conduits in each of the areas of contact.

9. The purification system of claim 8, wherein the arcuate sides are smooth.

10. The purification system of claim 8, wherein the first end portion, second end portion, and middle portion are in the same plane.

11. The purification system of claim 8, comprising:
a second clip for securing another pair of flow conduits to the purification head assembly.

12. The purification system of claim 11, wherein the first clip and the second clip are disposed on opposite portions of the purification head assembly.

13. The purification system of claim 8, wherein the flexible extending sections of the first clip extend laterally away from said main body section further than the central extending section.

14. The purification system of claim 8, wherein the main body section defines a first notch extending laterally into the main body section and open to the first opening and a second notch extending laterally into the main body section and open to the second opening.

* * * * *